United States Patent [19]

Stewart, Jr.

[11] Patent Number: 5,350,223
[45] Date of Patent: Sep. 27, 1994

[54] SELF-PURGING VEHICLE BRAKING SYSTEM

[75] Inventor: Howard C. Stewart, Jr., High Point, N.C.

[73] Assignee: Stewart Components, High Point, N.C.

[21] Appl. No.: 14,700

[22] Filed: Feb. 8, 1993

[51] Int. Cl.$^5$ .............................................. B60T 15/00
[52] U.S. Cl. ...................................... 303/84.2; 60/591; 137/854
[58] Field of Search .................. 137/854; 303/84.2, 68; 188/151 A, 352; 60/591

[56] References Cited

U.S. PATENT DOCUMENTS

| | | | |
|---|---|---|---|
| 2,742,982 | 9/1952 | Helmbold | 188/152 |
| 2,805,737 | 9/1959 | Griffin | 60/591 |
| 3,037,522 | 6/1962 | Millan | 137/854 |
| 3,420,342 | 3/1967 | Botterill | 188/264 |
| 3,439,500 | 4/1969 | Hertell | 303/84.2 |
| 3,760,912 | 2/1973 | Braun | 303/84.2 |
| 4,014,410 | 3/1977 | Bryant | 188/71.6 |
| 4,132,241 | 1/1979 | Iannelli | 137/854 |
| 4,373,333 | 2/1983 | Coleman | 60/578 |
| 4,799,575 | 1/1989 | Kroniger | 188/71.6 |

OTHER PUBLICATIONS

"Wildwood Self Bleeding Brake Fluid System" Mar. 23, 1993.

Primary Examiner—Matthew C. Graham
Attorney, Agent, or Firm—Bell, Seltzer, Park & Gibson

[57] ABSTRACT

A vehicle braking system is characterized by being constructed for self-purging and removal of air from the brake lines to thereby prevent the accumulation of air therein so as to provide a more effective braking system. The braking system has a master cylinder including a fluid reservoir for supplying brake fluid to the braking system and a hydraulically controlled disk brake having a caliper including a plurality of cylinders arranged in the caliper and a plurality of respective hydraulically actuable brake pistons guided in the cylinders. An inlet brake line interconnects the master cylinder and the caliper for supplying brake fluid to the caliper and an outlet brake line also interconnects the master cylinder and the caliper for receiving brake fluid from the caliper. The flow control means of the present invention has a housing having a first opening connecting an inlet brake line thereto, a second opening connecting an outlet brake line thereto, and a third opening connecting a master cylinder of the braking system thereto. A first check valve is positioned within the housing for allowing fluid to flow therethrough in only one direction, and a second check valve is positioned within the housing for allowing fluid to flow therethrough in only a common direction as the fluid flow through the first check valve.

26 Claims, 3 Drawing Sheets

SELF-PURGING VEHICLE BRAKING SYSTEM

FIELD OF THE INVENTION

This invention relates to braking systems for vehicles and more particularly to braking systems having brake fluid circulating through the braking system and a brake valve assembly for such systems.

BACKGROUND OF THE INVENTION

Various types of brakes, such as electric, air, drum, and disk, have been developed for various types of vehicles and uses. Air brakes, for example, are commonly used on heavy-duty trucks. Drum brakes have been commonly used on other automobiles where such heavy loads are not involved, but federal laws requiring disk-type brakes on new cars have caused the disk-type brake to become more popular. Disk-type brakes are usually less subject to water fading and are typically more resistant to heat fading due to high speed or repeated stops than drum brakes. Also, disk-type brakes are capable of straight-line stops so that hard braking effort does not cause the automobile to pull to the right or to the left.

Although disk brakes have several advantages over drum brakes, problems have also been discovered during some types of uses of disk brakes. For example, when these type of brakes are used with cars enduring high speeds over a long period of time, such as with race cars, the brake pedal often develops a spongy feeling or brake fade which reduces the brakes' effectiveness and produces less than optimum braking action. The spongy feeling in the brake pedal is typically caused by boiling hydraulic fluid or water in or around the brake caliper. The boiling hydraulic fluid or water, in turn, is caused by the heat generated from the application of the brakes at high speeds.

Some attempts to solve this problem have included forcing air into the caliper area or circulating water through the caliper area to keep the fluid from boiling. These attempts, however, have failed because of the lack of understanding of the braking system operation.

Other attempts recognized that some of the brake fade is caused by the brake fluid remaining in the caliper. Therefore, attempts to solve the problem based on this recognition have arranged check valves either within or closely adjacent the disk brakes to allow fluid to circulate through the brake caliper. An example of such a disk brake, according to U.S. Pat. No. 4,799,575 by Kroniger entitled "Hydraulically Controlled Disk Brake With Serial Fluid Flow" is shown in FIG. 1.

Figure 1:
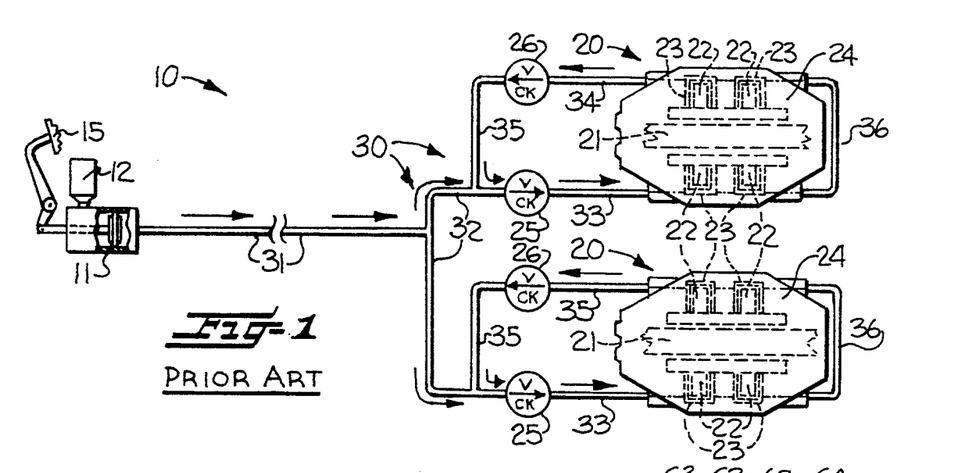
FIG. 1 is a schematic view of a prior art vehicle braking system for a pair of disk brakes.

The braking system 10 of FIG. 1 has a master cylinder 11 which includes a fluid reservoir 12 and a brake pedal 15 connected to the master cylinder 11 for actuation of the braking system 10. A pair of hydraulically controlled disk brakes 20 are connected to the master cylinder 11 by brake lines 30. In operation, the fluid flows along brake line region 31 and into brake line region 32. The fluid flows through a first check valve 25 and into brake line region 33. Fluid is prevented from flowing into brake line region 34 by a second check valve 26. The fluid flows from brake line 33, down into the caliper 24, and to a plurality of pistons 22 and cylinders 23 guiding the pistons 22. The fluid then flows through brake line region 36, back to the pistons 22 and cylinders 23, and into brake line region 34. The fluid further flows through the second check valve 26 through brake line region 35 and back to the master cylinder 11. This attempt, although allowing some fluid to circulate through the brake caliper 24, failed to completely solve the brake fade because air or gas continues to accumulate within the brake lines 30 of the braking system 10.

Thus, there is a need for a braking system that provides circulation of fluid through the brake caliper and purges the brake lines of air or gas therein.

SUMMARY OF THE INVENTION

Therefore, the present invention provides a vehicle braking system characterized by being constructed for self-purging and removal of air from the brake lines to thereby prevent the accumulation of air or gas therein so as to provide a more effective braking system.

More particularly, the braking system has a a master cylinder including a fluid reservoir for supplying brake fluid to the braking system and a hydraulically controlled disk brake having a caliper including a plurality of cylinders and a plurality of respective hydraulically actuable brake pistons guided in the cylinders. An inlet brake line interconnects the master cylinder and the caliper for supplying brake fluid to the caliper and an outlet brake line also interconnects the master cylinder and the caliper for receiving brake fluid from the caliper. Flow control means in the form of a brake valve assembly is associated with and in fluid communication with the inlet and outlet brake lines and is positioned remote from the caliper and adjacent the master cylinder for directing fluid flow from the master cylinder through the inlet brake line and directing fluid flow to the master cylinder from the outlet brake line during operation of the braking system so that air entrapped in the brake lines may flow to the master cylinder for removal of the air and thereby purge the brake lines of the air and provide a more effective braking system.

The brake valve assembly has a housing having a first opening for connecting an inlet brake line thereto, a second opening for connecting an outlet brake line thereto, and a third opening for connecting a master cylinder of the braking system thereto. First valve means in the form of a check valve is positioned within the housing for allowing fluid to flow therethrough in only one direction and through the first opening, and second valve means also in the form of a check valve is positioned within the housing for allowing fluid to flow therethrough and through the second opening in a common direction as the fluid flow through the first valve means.

BRIEF DESCRIPTION OF THE DRAWINGS

Some of the objects and advantages of the present invention having been stated, others will become apparent as the description proceeds when taken in conjunction with the accompanying drawings, in which.

DESCRIPTION OF THE ILLUSTRATED EMBODIMENTS

The present invention now will be described more fully hereinafter with reference to the accompanying drawings in which preferred embodiments of the invention are shown. This invention may, however, be embodied in many different forms and should not be construed as limited to the embodiments set forth herein; rather, the embodiments are provided so that this disclosure will be thorough and complete, and will fully convey the scope of the invention to those skilled in the art. Like numbers refer to like elements throughout.

Figures 2, 3:
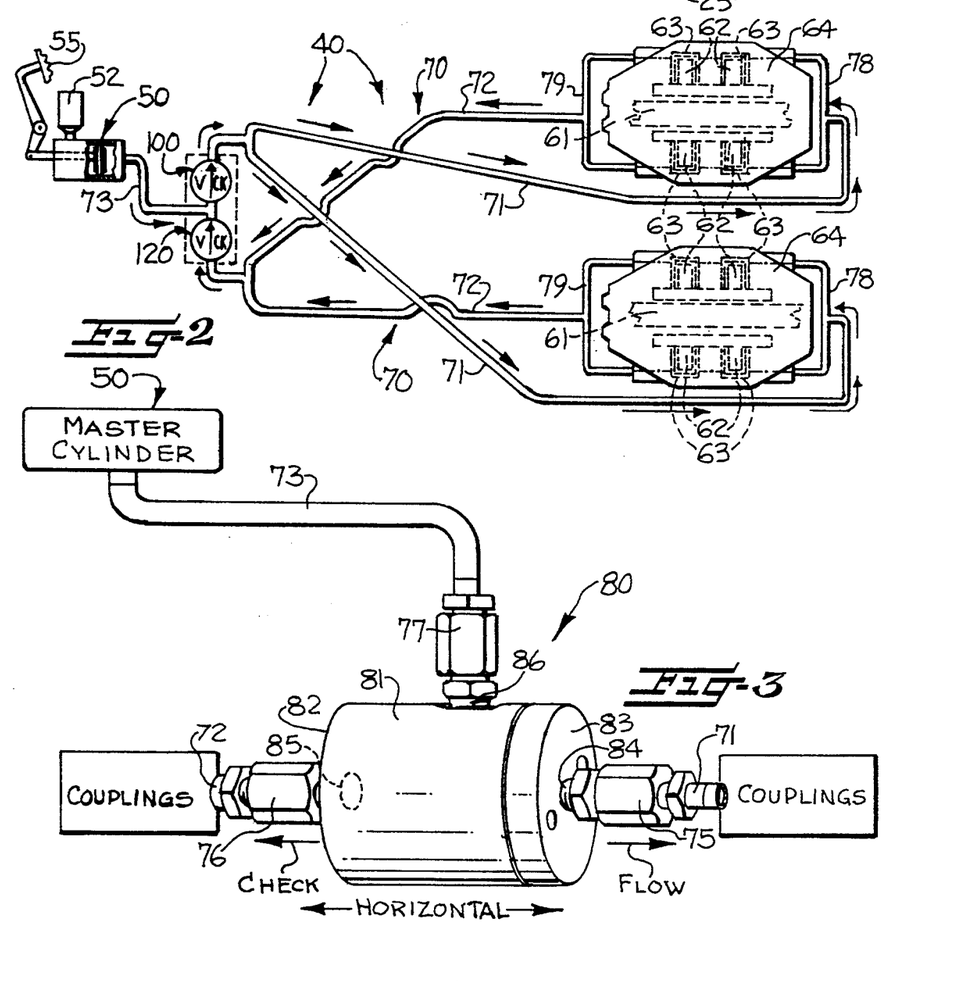
FIG. 2 is a schematic view of a vehicle braking system for a pair of disk brakes according to the present invention.
FIG. 3 is an enlarged elevational view of a braking valve assembly positioned in a braking system according to the present invention.

Referring now to the drawings, FIG. 1 is a schematic view of the prior art vehicle braking system 10 previously described having two disk brakes 20 which allow some fluid circulation through the brake caliper 24 of the vehicle braking system 10 as illustrated by the directional arrows. FIG. 2, in contrast, is a schematic view of a vehicle braking system 40 according to the present invention also illustrating fluid flow by directional arrows. As shown in FIGS. 2–5, the vehicle braking system 40 according to the present invention is characterized by being constructed for self-purging and removal of air from the brake lines 70 to thereby prevent the accumulation of air or gas therein so as to provide a more effective braking system 40. Self-purging or removal of air would include the purging and removal of various gases from the brake calipers 64 and brake lines 70, whether the air is trapped in the system 40 from installation or the like or from fluid, such as water or brake fluid, within the system 40, changing phases, such as from a liquid to a vapor, during heating thereof.

The braking system 40 of the present invention has a master cylinder 50 which typically includes a fluid reservoir 52 for supplying brake fluid to the braking system 40 and a hydraulically controlled disk brake 60 having a caliper 64 including a plurality of cylinders 63 and a plurality of respective hydraulically actuable brake pistons 62 guided in the cylinders 63. An inlet brake line 71 interconnects the master cylinder 50 to the caliper 64 for supplying brake fluid to the caliper 64 and an outlet brake line 72 also interconnects the master cylinder 50 to the caliper 64 for receiving brake fluid from the caliper 64. Flow control means, shown in the form of a brake valve assembly 80, is associated with and in fluid communication with the inlet brake line 71 and outlet brake line 72 and is positioned remote from the caliper 64 and adjacent the master cylinder 50. The brake valve assembly 80 preferably is positioned closely adjacent and within 15 inches of the master cylinder 50 for directing fluid flow from the master cylinder 50 through the inlet brake line 71 and for directing fluid flow to the master cylinder 50 from the outlet brake line 72 during operation of the braking system 40. The distance between the brake valve assembly 80 and the master cylinder 50 is preferably about 4 inches. As will be apparent to those skilled in the art, the positioning of the brake valve assembly 80 with respect to the master cylinder 50 may vary within the aforementioned 15 inches depending on the diameter of the brake lines and the temperature, or type and hence the viscosity, of the fluid within the system.

Figure 4:
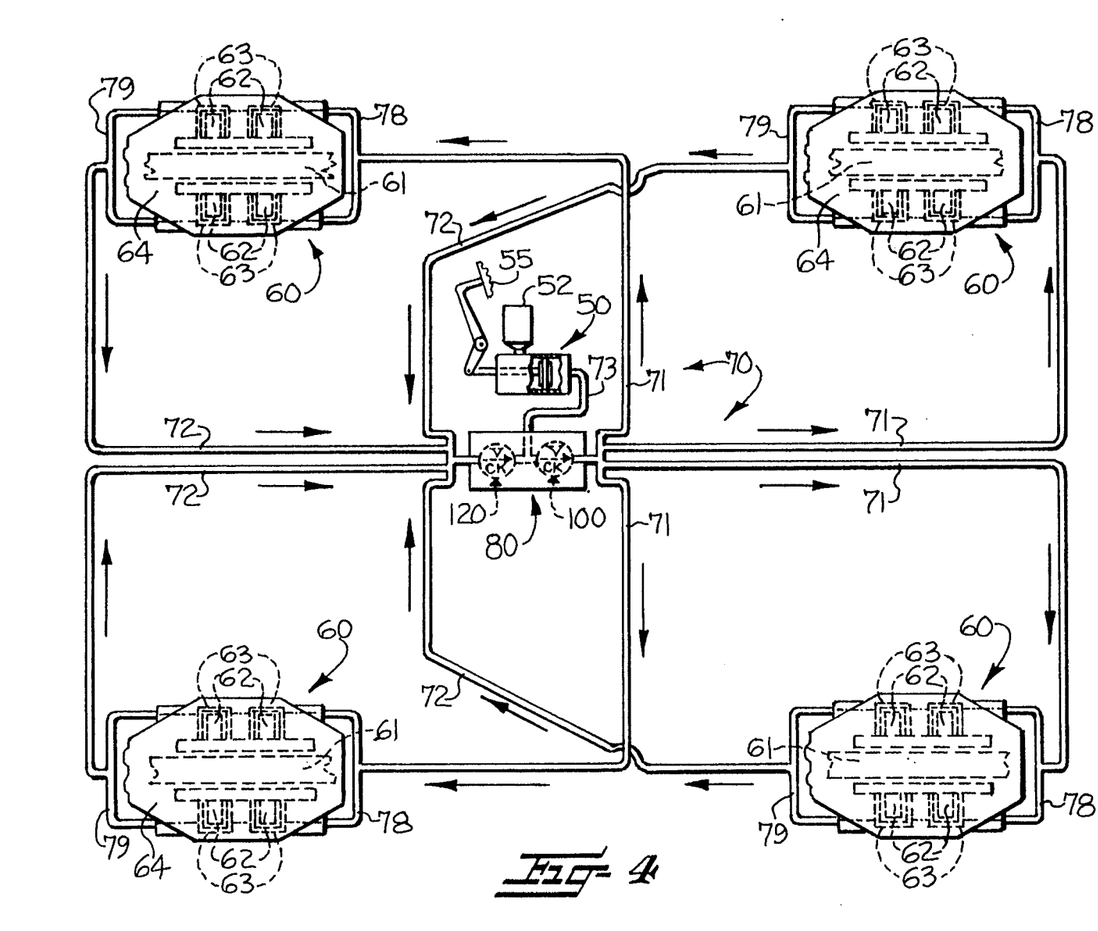
FIG. 4 is a schematic view of a vehicle braking system for four disk brakes according to the present invention.
Figure 5:
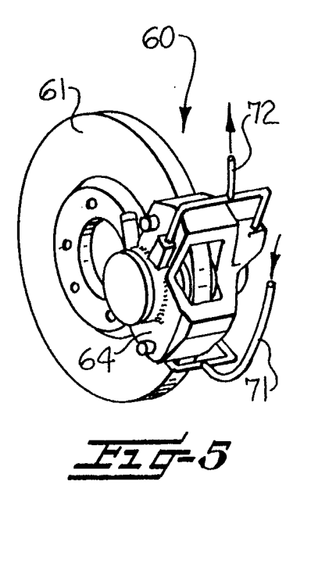
FIG. 5 is a perspective view of a hydraulically controlled disk brake according to the present invention.
Figure 6:
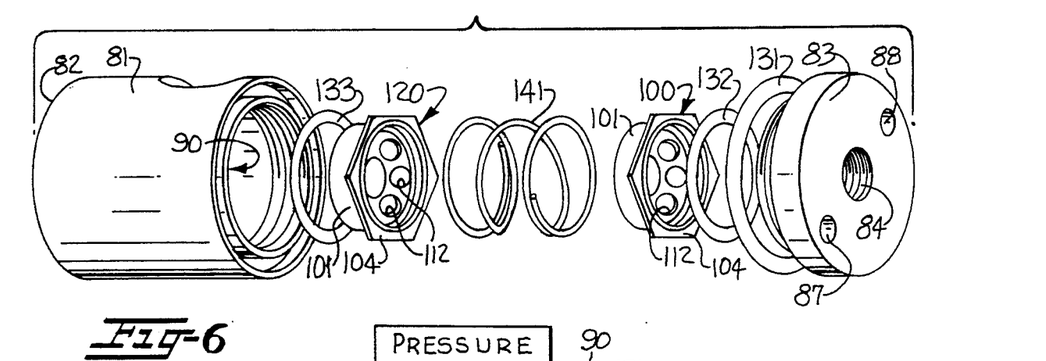
FIG. 6 is an exploded view of the brake valve assembly according to the present invention.

FIG. 2 shows a vehicle braking system 40 having a pair of disk brakes 60 connected to inlet 71 and outlet 72 brake lines and to the brake valve assembly 80. FIG. 4 shows a vehicle braking system 40 having four disk brakes connected to inlet 71 and outlet 72 brake lines and to the brake valve assembly 80. Accordingly, the brake valve assembly 40 may be adapted to connect to one or more disk brakes 60 for removal and self-purging of air.

The brake valve assembly 80 has a housing 81, and first valve means, shown in the form of a first check valve 100, positioned therein for directing fluid flow therethrough to the inlet brake line 71 in only one direction to thereby supply fluid flowing to the caliper 64 and second valve means, shown in the form of a second check valve 120, positioned therein for directing fluid flow therethrough from the outlet brake line 72 in only one direction to thereby receive fluid flowing from the caliper 64 so that air entrapped in the brake lines 70 may flow to the master cylinder 50 for removal of the air and thereby purge the brake lines 70 of the air and provide a more effective braking system 40. It will be apparent to those skilled in the art that various other types of valves or check valves for fluid control may also be used, such as a ball and spring type check valve, for the present invention and it is intended that the invention not be limited to the type of valve or check valve shown. As further shown in FIG. 3, the housing 81 of the brake valve assembly 80 has a substantially cylindrical overall shape and is horizontally disposed. The housing 81 has the inlet brake line 71 connected to an end 83 of the cylindrical housing 81 and the outlet brake line 72 connected to the opposite end 82 of the cylindrical housing 81, and has the master cylinder 50 connected to a medial portion of the cylindrical housing 81.

FIGS. 6–9 show the construction and operation of the brake valve assembly 80. The housing 81 of the brake valve assembly has a first opening 84 in an end 83 of the housing 81 adapted for connecting an inlet brake line 71 thereto and a second opening 85 in substantial alignment with the first opening 84 in another end 82 of the housing 81 adapted for connecting an outlet brake line 72 thereto. A third opening 86 in a medial portion of the housing 81 is adapted for connecting the master cylinder 50 of the braking system 40 thereto. The first check valve 100 is positioned within the housing 81 for allowing fluid to flow therethrough in only one direction and through the first opening 84. A second check valve 120 is positioned within the housing 81 for allowing fluid to flow therethrough and through the second opening 85 and in only the opposite direction from the fluid flow through the first check valve 100. Resilient means shown in the form of a coiled spring 141, is positioned between the first 100 and second 120 check valves to maintain the check valves 100, 120 in a predetermined aligned position within the housing 81 of the brake valve assembly 80. The first 100 and second 120 check valves are oriented to face a common direction toward the second opening 85.

Figure 7:
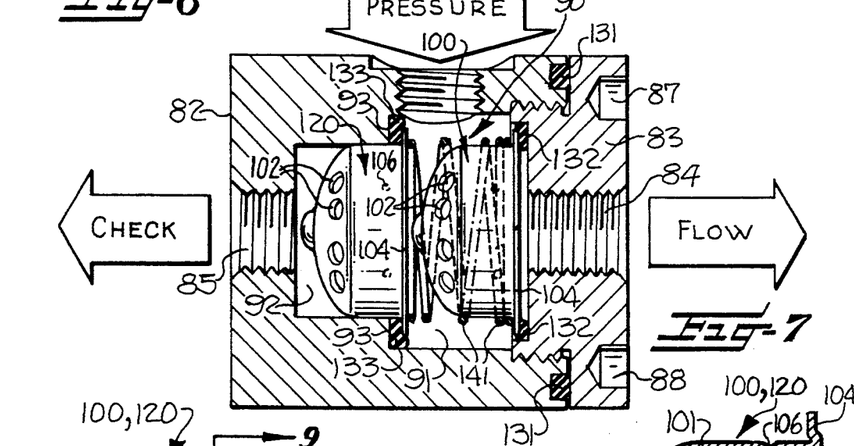
FIG. 7 is a cross-sectional view of the brake valve assembly according to the present invention.

As best shown in the longitudinal cross-sectional view of FIG. 7, the housing 81 of the brake valve assembly 80 also has an inner expansion chamber 90 within the housing having a greater circumference and positioned between the first 84 and second 85 openings. The expansion chamber 90 has a first portion 91 and a second portion 92 for positioning the respective first 100 and second 120 check valves therein. The first portion 91 of the expansion chamber 90 has a greater circumference than the second portion 92 and the two portions 91, 92 are divided by an inner housing ledge 93. The third opening 86 in the housing 81 allows fluid to flow into and from the first portion of the expansion chamber 90. Therefore, a type of centrifugal action is provided by the three openings 84, 85, 86 expanding into the expansion chamber 90 and the multi-directional fluid flow through the openings 84, 85, 86 to and from the expansion chamber 90.

Figure 8:
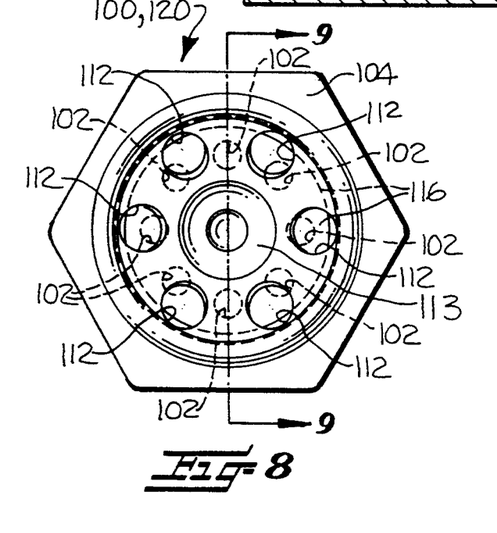
FIG. 8 is a top plan view of the check valve of the brake valve assembly according to the present invention.
Figure 9:
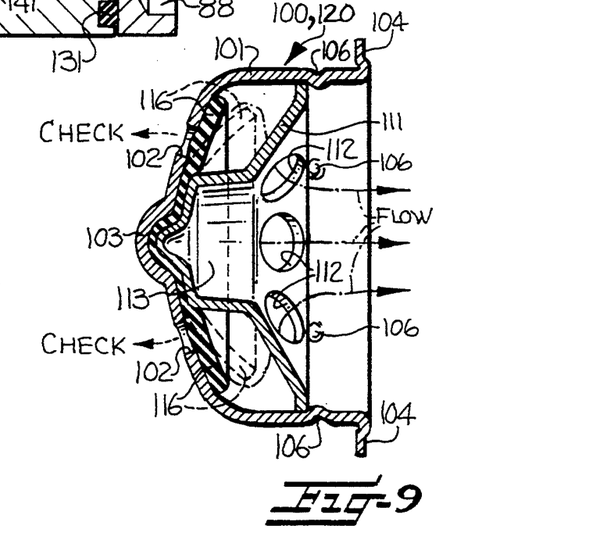
FIG. 9 is a longitudinal cross-sectional view of the check valve of the brake valve assembly according to the present invention.

FIGS. 8 and 9 show the construction of each check valve 110, 120 in the brake valve assembly 80. Each check valve 100, 120 has a perforated member as shown as a dome shaped outer housing 101 having a plurality of holes 102 therein and a second perforated member shown as a concave inner housing having a lesser plurality of holes 112 therein than the outer housing 101. The inner housing 111 is matingly received by the outer housing 101 and is secured in place by securing means shown as indentions 106, in the outer housing 101. Resilient means, shown in the form of an elastomeric rubber disk 116, is positioned between the outer 101 and inner 111 housings and covers the plurality of holes 102 in the outer housing 101 so that fluid flow is prevented when flowing through the holes 112 of the inner housing 111 toward the outer housing 101 and is allowed when flowing through the holes 102 of the outer housing 101 toward the inner housing 111. The rubber disk 116 of the first 100 and second 120 check valves has a medial portion thereof fixed between medial portions 103, 113 of the outer 101 and inner 111 housings so that peripheral portions of the rubber disk 116 cover the plurality of holes 102 in the outer housing 101. The outer housing 101 of each of the first 100 and second 120 check valves also has an outward flange 104 at the base of the dome-shape for positioning the check valves 100, 120 within the expansion chamber of the housing 81 of the brake valve assembly 80.

In the drawings and specification, there has been disclosed a typical preferred embodiment of the invention and, although specific terms are employed, they are used in a generic and descriptive sense only and not for the purposes of limitation, the scope of the invention being set forth in the following claims.

What is claimed is:

1. A vehicle braking system characterized by being constructed for self-purging and removal of air from the brake lines to thereby prevent the accumulation of air therein so as to provide a more effective braking system, the braking system comprising a master cylinder including a fluid reservoir for supplying brake fluid to the braking system, a hydraulically controlled disk brake having a caliper including a plurality of cylinders and a plurality of respective hydraulically actuable brake pistons guided in said cylinders, an inlet brake line interconnecting said master cylinder and said caliper for supplying brake fluid to said caliper, an outlet brake line interconnecting said master cylinder and said caliper for receiving brake fluid from said caliper, and flow control means associated with and in fluid communication with said inlet and outlet brake lines and positioned remote from said caliper and adjacent said master cylinder for restricting fluid flow from said master cylinder only through said inlet brake line and for restricting fluid flow to said master cylinder only from said outlet brake line during operation of the braking system so that air entrapped in said brake lines is directed from said outlet brake line, through said flow control means, to said master cylinder positioned adjacent said flow control means, and toward said fluid reservoir of said master cylinder for removal of the air and thereby purge said brake lines of the air.

2. A vehicle braking system according to claim 1, wherein said flow control means comprises first and second valve means positioned for fluid communication with said brake lines.

3. A vehicle braking system according to claim 2, wherein said inlet brake line connects to said caliper at a lower portion thereof and said outlet brake line connects to said caliper at an upper portion thereof, said upper portion being positioned at a higher elevation than said lower portion so that air within said caliper may rise and will more effectively be removed from said caliper through said outlet brake line.

4. A vehicle braking system according to claim 2, wherein said flow control means further comprises a housing having a substantially cylindrical overall shape and having said first and second valve means positioned therein, said master cylinder being connected to a medial portion of said cylindrical housing and in fluid communication with said first and second valve means, said inlet brake line being connected to an end of said cylindrical housing and in fluid communication with said first valve means for restricting fluid flow from said master cylinder, through said medial portion of said housing, and only through said inlet brake line, and said outlet brake line being connected to another end of said cylindrical housing and in fluid communication with said second valve means for restricting fluid flow to said master cylinder only from said outlet brake line, through said second valve means, and through said medial portion of said housing.

5. A vehicle braking system according to claim 4, wherein said cylindrical housing is horizontally disposed within the braking system.

6. A vehicle braking system according to claim 1, wherein said flow control means is positioned less than 15 inches from said master cylinder for more effectively providing self-purging and removal of air within the braking system.

7. A vehicle braking system according to claim 6, wherein said flow control means is positioned about 4 inches from said master cylinder for more effectively providing self-purging and removal of air within the braking system.

8. A vehicle braking system characterized by being constructed for self-purging and removal of air from the brake lines to thereby prevent the accumulation of air therein so as to provide a more effective braking system, the braking system comprising a master cylinder including a fluid reservoir for supplying brake fluid to the braking system, at least a pair of hydraulically controlled disk brakes, each of said disk brakes having a caliper including a plurality of cylinders and a plurality of respective hydraulically actuable brake pistons guided in said cylinders, an inlet brake line interconnecting said master cylinder to each of said calipers for supplying brake fluid to said calipers, an outlet brake line interconnecting said master cylinder to each of said calipers for receiving brake fluid from said calipers, and flow control means associated with and in fluid communication with said inlet and outlet brake lines and positioned remote from said calipers and closely adjacent said master cylinder for restricting fluid flow from said master cylinder only through said inlet brake line and for restricting fluid flow to said master cylinder only from said outlet brake line during operation of the braking system, said flow control means comprising a brake valve assembly having a housing, and first valve means positioned in said housing for restricting fluid flow therethrough to said inlet brake line in only one direction to thereby supply fluid flowing to each of said calipers and second valve means positioned in said housing for restricting fluid flow therethrough from said outlet brake line in only one direction to thereby receive fluid flowing from each of said calipers so that air entrapped in said brake lines is directed from said outlet brake line, through said flow control means, to said master cylinder positioned adjacent said flow control means, and toward said fluid reservoir of said master cylinder for removal of the air and thereby purge said brake lines of the air.

9. A vehicle braking system according to claim 8, wherein said first valve means comprises a check valve and said second valve means comprises a check valve.

10. A vehicle braking system according to claim 8, wherein said brake valve assembly is positioned less than 15 inches from said master cylinder for more effectively providing self-purging and removal of air within the braking system.

11. A vehicle braking system according to claim 10, wherein said brake valve assembly is positioned about 4 inches from said master cylinder for more effectively providing self-purging and removal of air within the braking system.

12. A vehicle braking system according to claim 8, wherein said flow control means further comprises said housing of said brake valve assembly having a substantially cylindrical overall shape and having said first and second valve means positioned therein, said master cylinder being connected to a medial portion of said cylindrical housing and in fluid communication with said first and second valve means, said inlet brake line being connected to an end of said cylindrical housing and in fluid communication with said first valve means for restricting fluid flow from said master cylinder, through said medial portion of said housing, and only through said inlet brake line, and said outlet brake line being connected to another end of said cylindrical housing and in fluid communication with said second valve means for restricting fluid flow to said master cylinder only from said outlet brake line, through said second valve means, and through said medial portion of said housing.

13. A vehicle braking system according to claim 12, wherein said cylindrical housing is horizontally disposed within the braking system.

14. A vehicle braking system according to claim 8, wherein said inlet brake line connects to said caliper at a lower portion thereof and said outlet brake line connects to said caliper at an upper portion thereof, said upper portions being positioned at a higher elevation than said lower portion so that air within said caliper may rise and will more effectively be removed from said caliper through said outlet brake line.

15. A vehicle braking system characterized by being constructed for self-purging and removal of air from the brake lines to thereby prevent the accumulation of air therein so as to provide a more effective braking system, the braking system comprising a master cylinder including a fluid reservoir for supplying brake fluid to the braking system, at least a pair of hydraulically controlled disk brakes, each of said disk brakes having a caliper including a plurality of cylinders and a plurality of respective hydraulically actuable brake pistons guided in said cylinders, an inlet brake line interconnecting said master cylinder to each of said calipers for supplying brake fluid to said calipers, an outlet brake line interconnecting said master cylinder to each of said calipers for receiving brake fluid from said calipers, and flow control means associated with and in fluid communication with said inlet and outlet brake lines and positioned remote from said calipers and about 4 inches from said master cylinder for restricting fluid flow from said master cylinder only through said inlet brake line and for restricting fluid flow to said master cylinder only from said outlet brake line during operation of the braking system, said flow control means comprising a brake valve assembly having a housing, and a first check valve positioned in said housing for restricting fluid flow therethrough to said inlet brake line in only one direction to thereby supply fluid flowing to each of said calipers and a second check valve positioned in said housing for restricting fluid flow therethrough from said outlet brake line in only one direction to thereby receive fluid flowing from each of said calipers so that air entrapped in said brake lines is directed from said outlet brake line, through said flow control means, to said master cylinder positioned adjacent said flow control means, and toward said fluid reservoir of said master cylinder for removal of the air and thereby purge said brake lines of the air.

16. A vehicle braking system according to claim 15, wherein said flow control means further comprises said housing of said brake valve assembly having a substantially cylindrical overall shape and having said first and second check valves positioned therein, said master cylinder being connected to a medial portion of said cylindrical housing and in fluid communication with said first and second check valves, said inlet brake line being connected to an end of said cylindrical housing and in fluid communication with said first check valve for restricting fluid flow from said master cylinder, through said medial portion of said housing, and only through said inlet brake line, and said outlet brake line being connected to another end of said cylindrical housing and in fluid communication with said second check valve for restricting fluid flow to said master cylinder only from said outlet brake line, through said second check valve, and through said medial portion of said housing.

17. A vehicle braking system according to claim 16, wherein said cylindrical housing is horizontally disposed within a braking system.

18. A vehicle braking system according to claim 15, wherein said inlet brake line connects to said caliper at a lower portion thereof and said outlet brake line connects to said caliper at an upper portion thereof, said upper portion being positioned at a higher elevation than said lower portion so that air within said caliper may rise and will more effectively be removed from said caliper through said outlet brake line.

19. A vehicle braking system for purging and removal of air from the brake lines to thereby prevent the accumulation of air therein so as to provide a more effective braking system, the braking system comprising a master cylinder including a fluid reservoir for supplying brake fluid to the braking system, a hydraulically controlled disk brake having a caliper including a plurality of cylinders arranged in the caliper and a plurality of respective hydraulically actuable brake pistons guided in said cylinders, an inlet brake line interconnecting said master cylinder and a lower portion of said caliper for supplying brake fluid to said caliper, an outlet brake line interconnecting said master cylinder and an upper portion of said caliper for receiving brake fluid from said caliper, said upper portion being positioned at a higher elevation than said lower portion, and flow control means associated with and being in fluid communication with said inlet and outlet brake lines and being positioned less than 15 inches from said master cylinder and between said caliper and said master cylinder for restricting fluid flow from said master cylinder only through said inlet brake line and for restricting return of fluid flow to said master cylinder only from said outlet brake line during operation of the braking system so that air entrapped in said brake lines is directed from said upper portion of said caliper, through said outlet brake line and said flow control means, to said master cylinder positioned less than 15 inches from said flow control means, and toward said fluid reservoir for removal of the air and thereby purge said brake lines of the air.

20. A vehicle braking system according to claim 19, wherein said flow control means comprises first and second valve means, said first valve means being in fluid communication with said inlet brake line and said second valve means being in fluid communication with said outlet brake line.

21. A vehicle braking system according to claim 20, wherein said flow control means further comprises a housing, and wherein said first and second valve means are each positioned within said housing.

22. A vehicle braking system according to claim 20, wherein said first and second valve means each comprises a check valve.

23. A vehicle braking system according to claim 22, wherein at least one of said check valves comprises a perforated member through which fluid may readily flow and resilient means cooperating with said perforated member for allowing fluid to flow in one direction through said perforated member and for preventing fluid from flowing through said perforated member in a direction opposite said one direction.

24. A vehicle braking system according to claim 23, wherein said resilient means comprises an elastomeric member overlying said perforated member.

25. A vehicle braking system for purging and removal of air from the brake lines to thereby prevent the accumulation of air therein so as to provide a more effective braking system, the braking system comprising a master cylinder including a fluid reservoir for supplying brake fluid to the braking system, a hydraulically controlled disk brake having a caliper including a plurality of cylinders arranged in the caliper and a plurality of respective hydraulically actuable brake pistons guided in said cylinders, an inlet brake line interconnecting said master cylinder and a lower portion of said caliper for supplying brake fluid to said caliper, an outlet brake line interconnecting said master cylinder and an upper portion of said caliper for receiving brake fluid from said caliper, said upper portion being positioned at a higher elevation than said lower portion, and flow control means comprising a first check valve associated with and in fluid communication with said inlet brake line and a second check valve associated with and in fluid communications with said outlet brake line, each of said check valves comprises a perforated member through which fluid may readily flow and a resilient member cooperating with said perforated member for allowing fluid to flow in one direction through said perforated member and for preventing fluid from flowing through said perforated member in a direction opposite said one direction, said first and second check valves being positioned adjacent said master cylinder and between said caliper and said master cylinder for restricting fluid flow from said master cylinder through said inlet brake line and to said lower portion of said caliper and for restricting fluid flow from said upper portion of said caliper through said outlet brake line to said master cylinder during operation of the braking system so that air entrapped in said brake lines is directed from said upper portion of said caliper, through said outlet brake line and said second check valve, to said master cylinder positioned adjacent said second check valve, and toward said fluid reservoir of said master cylinder for removal of the air and thereby purge said brake lines of the air.

26. A vehicle braking system according to claim 25, wherein said flow control means further comprises a housing, and wherein said first and second valve means are each positioned within said housing.

* * * * *

(12) REEXAMINATION CERTIFICATE (4375th)
United States Patent
Stewart, Jr.

(10) Number: US 5,350,223 C1
(45) Certificate Issued: Jun. 12, 2001

(54) SELF-PURGING VEHICLE BRAKING SYSTEM

(75) Inventor: Howard C. Stewart, Jr., High Point, NC (US)

(73) Assignee: Stewart Components, High Point, NC (US)

Reexamination Request:
No. 90/005,638, Feb. 17, 2000

Reexamination Certificate for:
Patent No.: 5,350,223
Issued: Sep. 27, 1994
Appl. No.: 08/014,700
Filed: Feb. 8, 1993

(51) Int. Cl.$^7$ .................................................. B60T 15/00
(52) U.S. Cl. ........................... 303/84.2; 60/591; 137/854
(58) Field of Search ................... 188/151 A, 352; 303/84.2, 68; 137/854; 60/591

(56) References Cited

U.S. PATENT DOCUMENTS

| | | |
|---|---|---|
| 2,742,892 | 4/1956 | Herzer . |
| 2,742,982 | 4/1956 | Helmbold . |
| 2,805,737 | 9/1957 | Griffin . |
| 3,037,522 | 6/1962 | Millan . |
| 3,420,342 | 1/1969 | Botterill . |
| 3,439,500 | 4/1969 | Hertell . |
| 3,661,429 | 5/1972 | Kito . |
| 3,760,912 | 9/1973 | Braun . |
| 4,014,410 | 3/1977 | Bryant . |
| 4,132,241 | 1/1979 | Ignelli . |
| 4,373,333 | 2/1983 | Coleman . |
| 4,799,575 | 1/1989 | Kroniger . |

OTHER PUBLICATIONS

"Wildwood [sic] Self Bleeding Brake Fluid System" Mar. 23, 1993.

*Primary Examiner*—M. C. Graham (57) ABSTRACT

A vehicle braking system is characterized by being constructed for self-purging and removal of air from the brake lines to thereby prevent the accumulation of air therein so as to provide a more effective braking system. The braking system has a master cylinder including a fluid reservoir for supplying brake fluid to the braking system and a hydraulically controlled disk brake having a caliper including a plurality of cylinders arranged in the caliper and a plurality of respective hydraulically actuable brake pistons guided in the cylinders. An inlet brake line interconnects the master cylinder and the caliper for supplying brake fluid to the caliper and an outlet brake line also interconnects the master cylinder and the caliper for receiving brake fluid from the caliper. The flow control means of the present invention has a housing having a first opening connecting an inlet brake line thereto, a second opening connecting an outlet brake line thereto, and a third opening connecting a master cylinder of the braking system thereto. A first check valve is positioned within the housing for allowing fluid to flow therethrough in only one direction, and a second check valve is positioned within the housing for allowing fluid to flow therethrough in only a common direction as the fluid flow through the first check valve.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–26 is confirmed.

* * * * *